(12) United States Patent
Benavides, III

(10) Patent No.: US 8,438,048 B1
(45) Date of Patent: May 7, 2013

(54) SYSTEMS AND METHODS FOR INTEGRATED PURCHASING OF VEHICLES AND VEHICLE INSURANCE

(75) Inventor: David R. Benavides, III, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 366 days.

(21) Appl. No.: 12/474,579

(22) Filed: May 29, 2009

(51) Int. Cl.
*G06Q 40/00* (2012.01)

(52) U.S. Cl.
USPC ............. 705/4; 705/3; 705/2; 705/40; 705/38

(58) Field of Classification Search ........................ 705/4
See application file for complete search history.

(56) References Cited

U.S. PATENT DOCUMENTS

| | | | |
|---|---|---|---|
| 6,064,751 A | 5/2000 | Smithies et al. | |
| 2004/0138994 A1* | 7/2004 | DeFrancesco et al. | 705/38 |
| 2007/0094296 A1* | 4/2007 | Peters, III | 707/102 |
| 2007/0136162 A1* | 6/2007 | Thibodeau et al. | 705/35 |
| 2007/0185728 A1* | 8/2007 | Schwarz et al. | 705/1 |
| 2007/0198369 A1 | 8/2007 | Grove et al. | |

OTHER PUBLICATIONS

"The Case for Optimizing Your Insurance", Oliver Wyman et al., 2007.*
Goersch, Daniel: "The Impact of Hybrid Channel Structures on the Customer Purchase Process: A Research Outline", Copenhagen Business School, 17 pages, (Aug. 12, 2000).

* cited by examiner

*Primary Examiner* — Hai Tran
(74) *Attorney, Agent, or Firm* — Schwegman Lundberg Woessner P.A.

(57) ABSTRACT

A system implemented on one or more computer processors for integrated purchasing of vehicles and vehicle insurance may comprise at least one subsystem configured for electronically receiving vehicle searching criteria, at least one subsystem configured for electronically providing available vehicles based on searching criteria, at least one subsystem configured for electronically receiving a vehicle selection of the provided available vehicles, at least one subsystem configured for automatically providing a financing quote for purchase of the vehicle selected, and at least one subsystem configured for automatically providing an insurance quote for the vehicle selected.

18 Claims, 8 Drawing Sheets

SYSTEMS AND METHODS FOR INTEGRATED PURCHASING OF VEHICLES AND VEHICLE INSURANCE

BACKGROUND

In the vehicle purchase process there are three basic steps (financing, purchasing, and insuring). A fundamental problem currently exists in how to seamlessly combine those steps into one basic process. In addition, there has traditionally been a gap in how to address "impulse shoppers" of a vehicle. Most of the time these "impulse shoppers" have not thought ahead to obtain financing options, have not researched much, and are unaware of insurance costs associated to a vehicle purchase. Current processes for purchasing an automobile makes it impossible for a financial institution to assist a shopper with financing an impulse buy of an automobile. Also, when a vehicle shopper has decided on the vehicle that they want to purchase, it is often difficult to quickly find automobile dealers closest to the shopper's current location that have the specific vehicle available. This often involves calling all the dealers in a particular area for a particular make of vehicle and/or searching on the Internet, which does not provide directions from a current location of the customer if they are away from their home searching on their mobile device.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for integrated purchasing of vehicles and vehicle insurance are described herein. For several embodiments, a system implemented on one or more computer processors for integrated purchasing of vehicles and vehicle insurance may comprise at least one subsystem configured for electronically receiving vehicle searching criteria, at least one subsystem configured for electronically providing available vehicles based on searching criteria, at least one subsystem configured for electronically receiving a vehicle selection of the provided available vehicles, at least one subsystem configured for automatically providing a financing quote for purchase of the vehicle selected, and at least one subsystem configured for automatically providing an insurance quote for the vehicle selected.

Additionally the system above may further comprise at least one subsystem configured for receiving an electronic signature for the financing quote for purchase of the vehicle selected, and at least one subsystem configured for automatically issuing an automobile loan for purchase of the selected vehicle based on the received electronic signature for the financing quote.

Other features and embodiments are described below.

BRIEF DESCRIPTION OF THE DRAWINGS

Systems and methods for integrated purchasing of vehicles and vehicle insurance are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
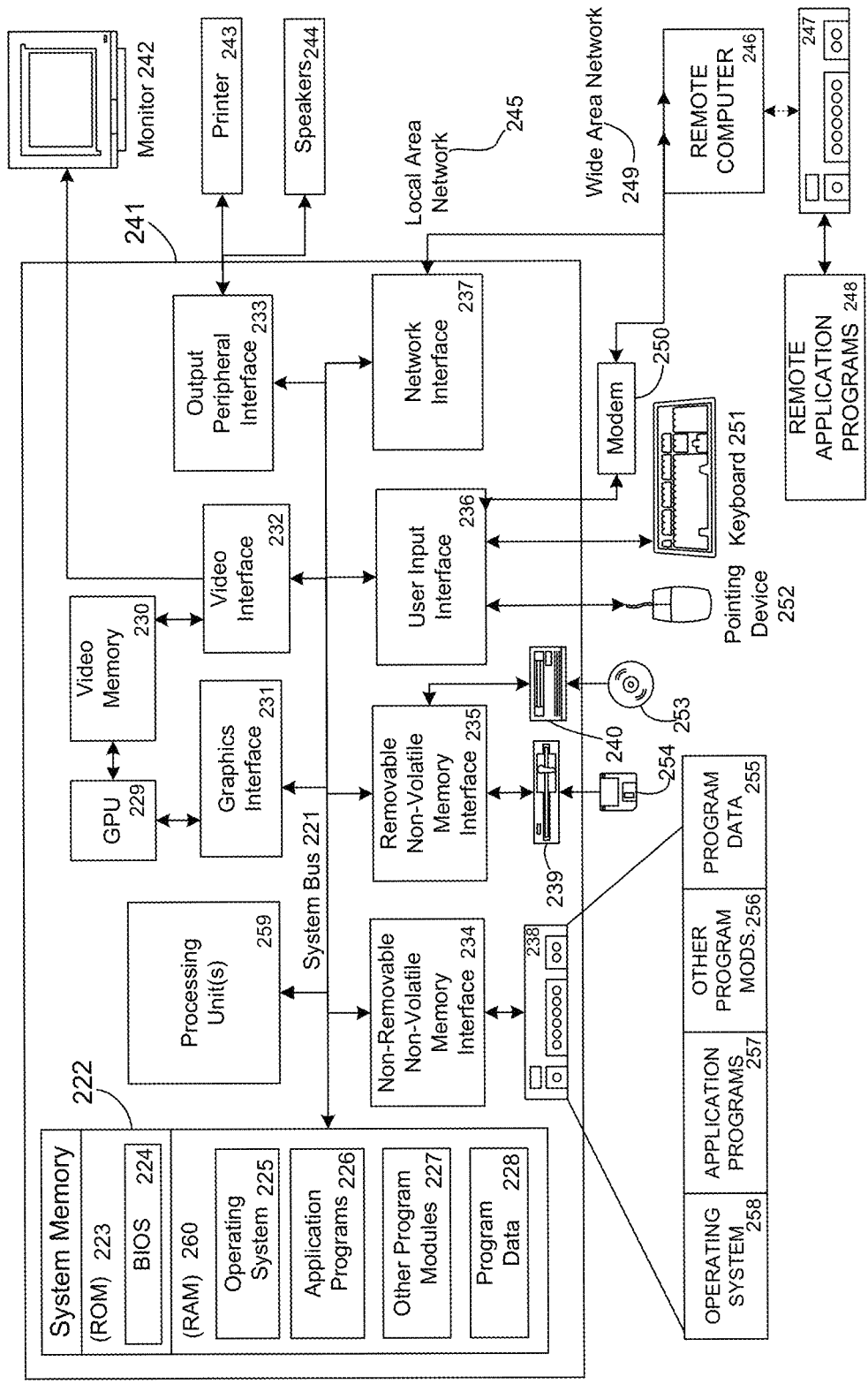
FIG. 1 is a block diagram representing an exemplary computing environment suitable for use in conjunction with implementing systems and methods for integrated purchasing of vehicles and vehicle insurance.

Referring next to FIG. 1, shown is a block diagram representing an exemplary computing environment suitable for use in conjunction with implementing the processes described below. For example, the computer-executable instructions that carry out the processes and methods for integrated purchasing of vehicles and vehicle insurance may reside and/or be executed in aspects of such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
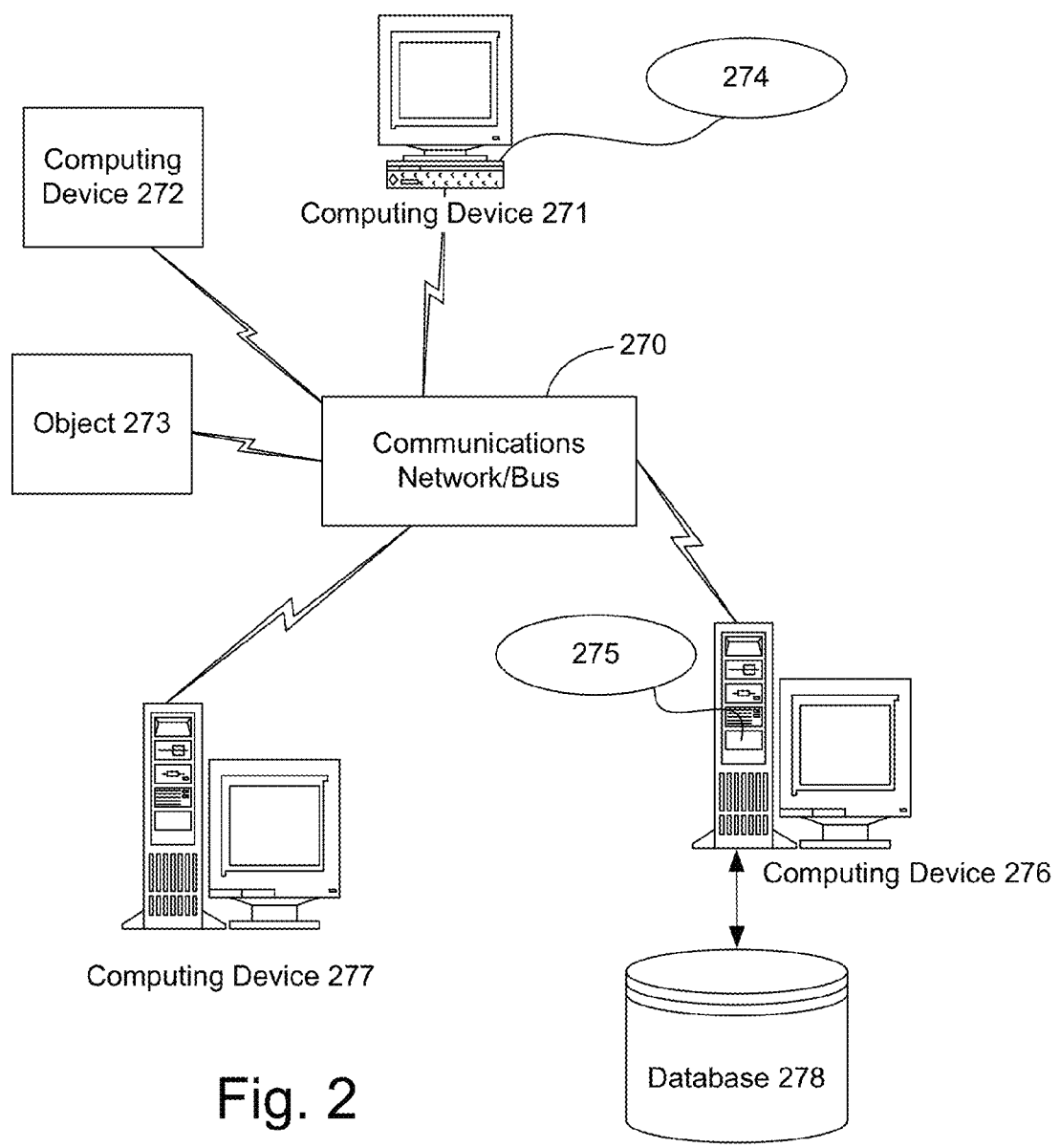
FIG. 2 illustrates an exemplary networked computing environment in which many computerized processes may be implemented to provide systems and methods for integrated purchasing of vehicles and vehicle insurance.

Referring next to FIG. 2, shown is an exemplary networked computing environment in which many computerized processes may be implemented to perform the processes described below. For example, various clients on the network of FIG. 2 may be using and/or implementing systems and methods for integrated purchasing of vehicles and vehicle insurance in a distributed computing environment. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
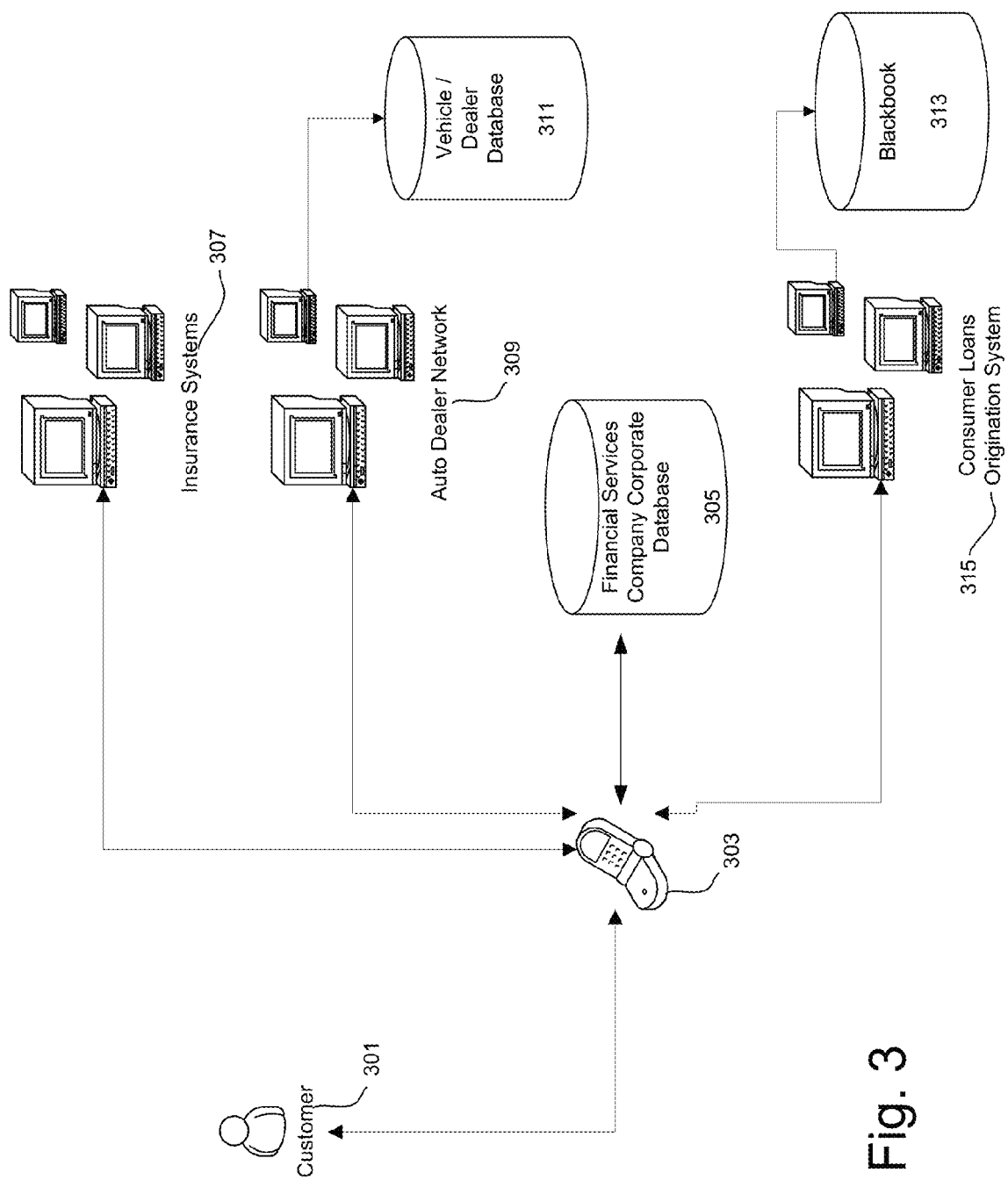
FIG. 3 is a block diagram of an example system for integrated purchasing of vehicles and vehicle insurance.

Referring next to FIG. 3 shown is a block diagram of an example system for integrated purchasing of vehicles and vehicle insurance. Shown is an example customer 301, an example mobile device of the customer 303, a financial services company corporate database 305, example automobile insurance systems 307, an example automobile dealer network 309 and associated vehicle/dealer database 311, and a consumer loans origination system 315 with an associated "Blackbook" database 313. The customer 301 may be in operably connected to the a financial services company corporate database 305, example automobile insurance systems 307, example automobile dealer network 309, and a consumer loans origination system 315 via one or more networks such as that shown in the exemplary networked computing environment of FIG. 2, for example, and may be operably connected to the network via a personal computer or a mobile device 303, for example. A mobile device as described herein may include, but is not limited to, one or a combination of the following types of wireless devices: cellular phone, smart phone, satellite phone, personal digital assistant (PDA), mobile computing devices, handheld computers, and other mobile communication devices.

The mobile device 303, financial services company corporate database 305, example automobile insurance systems 307, example automobile dealer network 309 with associated vehicle/dealer database 311, and the consumer loans origination system 315 with associated "Blackbook" database 313 may all be operably connect to, and in operable communication with, each other over one or more networks such as that shown in the exemplary networked computing environment of FIG. 2, for example.

For example, the network through which the mobile device 303 connects to the other system shown in FIG. 3 may be one or a combination of the following types of networks: computer communications network, the Internet, an intranet, data communications network, close or long range wireless network, satellite network, cellular network, telephone network, radio network, etc. The financial services company corporate database 305, example automobile insurance systems 307, example automobile dealer network 309, and a consumer loans origination system 315 may be used to provide a plurality of financial transactions including but not limited to banking transactions, insurance transactions and a plurality of other financial transactions. The financial services company may be an Integrated Financial Services company, for example, or anyone performing banking, investing, financial or insurance transactions for customer 301.

The insurance systems 307 are those computerized systems of an insurance provider, which may be the same entity as the financial services company of the financial services company corporate database 305, operable for issuing insurance quotes and insurance policies to customer 301 in an automated fashion based on received information from the customer 301 through mobile device 303. The financial services company corporate database 305 may be comprised of customer records (including those records of example customer 301), and business rules for providing consumer automobile loans, automobile insurance, and other financial transactions in an automated fashion based on received information from the customer through mobile device 303 and the other system shown in FIG. 3.

The automobile dealer network 309 may be a network of automobile dealers that is operable for providing information regarding the automobile dealers in the network to the example automobile insurance systems 307, the example financial services company corporate database 305, and example consumer loans origination system 315. This information may include, but is not limited to information such as price, year, make model, color, options, and photographs of available vehicles for sale at individual dealers in the automobile dealer network 309 and also salespeople and location information of those dealers. This information may be stored collectively, for example, in the vehicle/dealer database 311 which is operably connected to and in operable communication with the auto dealer network 309. Also, in one embodiment the automobile dealer network 309 may be part of the financial services company having the financial services company corporate database 305.

The consumer loans origination system 315 may be a system operable for issuing automobile loan quotes and automobile loans to customer 301 in an automated fashion based on received information from the customer through mobile device 303. The consumer loans origination system 315 may be a system of the same entity as that of the insurance systems 307 and financial services company corporate database 305, for example. Vehicle pricing and value information may be stored in the "Blackbook" database 313, which is operably connected to and in operable communication with the loans origination system 315.

Figure 4:
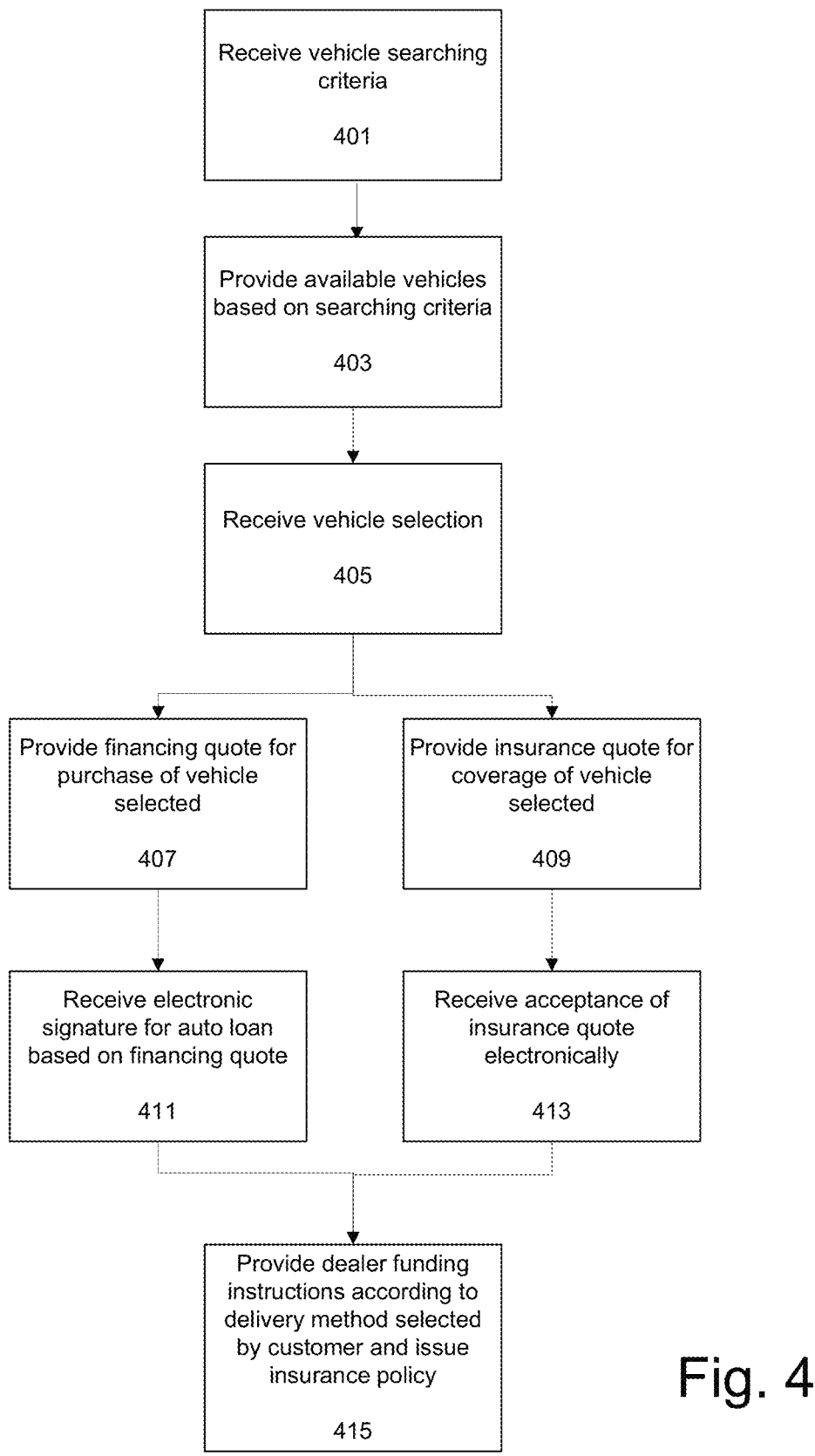
FIG. 4 is a flowchart illustrating an example process for integrated purchasing of vehicles and vehicle insurance.

Referring next to FIG. 4, shown is a flowchart illustrating an example process for integrated purchasing of vehicles and vehicle insurance. First, vehicle searching criteria may be received 401 from a customer 301 through a mobile device 303 (such as that shown in FIG. 3). The vehicle searching criteria may include, but is not limited to the following information: vehicle identification number (VIN), vehicle year, make, model, options, color, body style, engine specifics, gas mileage, efficiency, location, miles driven, etc. Information regarding available vehicles may then be automatically provided 403 based on the received searching criteria. Available vehicles matching the search criteria may be searched in various vehicle databases such as the vehicle/dealer database 311 of FIG. 3, for example to obtain vehicle identification information such as the VIN and stock number of particular specific vehicles available for purchase that match in full or in part the search criteria. Available vehicles that do not match the searching criteria exactly, but match the searching criteria to a certain extent may also be provided. Also, information regarding the extent to which the available vehicles match the searching criteria may also be provided and sorted based on the extent to which they match the searching criteria. This available vehicle information may be provided, for example, by communicating such information over a network and displaying the information on a mobile device 303 of a customer 301.

A vehicle selection may then be received 405 from a customer 301. For example, the customer may push or click on a button on an interface of their mobile device 303 to indicate they are interested in a particular available vehicle. An automobile financing quote for the selected vehicle may then be provided 407 along with providing 409 an insurance quote for coverage of the selected vehicle to the customer 301 on a mobile device 303 of the customer. The financing quote may be based on the selected vehicle information including, but not limited to, one or more of the following: vehicle identification number (VIN), vehicle year, make, model, options, color, body style, engine specifics, gas mileage, efficiency, location, miles driven, current value, etc. The financing quote may also be based on information regarding the customer 301. For example the customer 301 may be identified via communications over the customer's mobile device 303 between the customer 301 and the financial services company corporate database 305. This may be performed in an automated fashion via an authentication process of the customer 301 via their mobile device 301 (e.g., by the customer 301 logging in to a system or network of the financial services company corporate database 305, insurance systems 307 and/or consumer loan origination system 315 shown in FIG. 3). The financial services company corporate database 305 may have various records regarding the customer 301 such as credit history, current assets of the customer 301, and current loans and accounts with the financial services company having the financial services company corporate database 305. This information may then be used in conjunction with the selected vehicle information to provide 407 the customer 301 with a financing quote for the selected vehicle. Also, various other offers and add-ons may be provided based on the customer information and selected vehicle information such as debt protection plans, vehicle maintenance plans, etc. Also, the final loan document may be made available electronically for review and perhaps individual electronic acceptance and signature by the customer, including, but not limited to, one or more of the following: the loan agreement, automatic payment agreement, debt protection terms and conditions, maintenance plan agreement, total loss protection agreement, etc. This documentation may be displayed on the mobile device 303 of the customer 301, for example. Options may also be provided for the customer to select loan terms such as the length of the loan, interest rate desired and payment amount desired, etc., and a loan may be offered taking into consideration these selections as well.

The insurance quote for coverage of the selected vehicle provided 409 the customer 301 may also be based on the selected vehicle information including but not limited to, one or more of the following: vehicle identification number (VIN), vehicle year, make, model, options, color, body style, engine specifics, gas mileage, efficiency, location, miles driven, current value, etc., and also based on information regarding the customer 301. As described above the customer 301 may be identified via communications over the customer's mobile device 303 between the customer 301 and the financial services company corporate database 305. This may be performed in an automated fashion via an authentication process of the customer 301 via their mobile device 301 (e.g., by the customer 301 logging in to a system or network of the financial services company corporate database 305, insurance systems 307 and/or consumer loan origination system 315 shown in FIG. 3). The financial services company corporate database 305 and/or the insurance systems 307 may have various insurance records regarding the customer 301 including, but not limited to, one or more of the following: current insurance policy information, current vehicles covered, insurance score, credit history, household information, driving records of customer 301 and those in customer's household, etc. This information may then be used in conjunction with the selected vehicle information to provide 409 the customer 301 with an insurance quote for the selected vehicle. For example, the insurance quote may be based on the additional of the selected car to a current automobile insurance policy of the customer with the financial services company having the financial services company corporate database 305 shown in FIG. 3. The insurance quote and financing quote may be provided 407 409 simultaneously, for example.

An electronic signature may then be received from the customer accepting 411 the vehicle financing quote and automobile loan associated with the financing quote. Also, an electronic acceptance or signature may also be received 409 from the customer 301 indicating acceptance of issuance of the insurance policy associated with the insurance quote provided. This electronic signature may be received by the consumer loan origination system 315 of FIG. 3, for example. After the electronic signature is received from the customer accepting 411 the vehicle financing quote and automobile loan associated with the financing quote and electronic acceptance or signature received from the indicating acceptance of issuance of the insurance policy associated with the insurance quote provided, then automobile dealer funding instructions may be provided 415 according to a delivery method selected by the customer 301 and the insurance policy may be issued. The customer may be given choices displayed on their mobile device 303 to select how the automobile dealer desires to receive instructions on how to receive the funding for payment for the vehicle resulting from the automobile loan electronically signed by the customer 301. The dealer instructions may then be sent by fax, email, or displayed on the mobile device 303 of the customer 301 according to the choice selected by the customer 301, for example. The dealer funding instruction options and issuance of the insurance policy 415 may be provided 407 409 simultaneously, for example.

The fax number or email address of the dealer may be entered into the mobile device or may already be known via information previously received from the automobile dealer network 309. The automobile loan funding and dealer instructions may originate from the consumer loan origination system 315 of FIG. 3, for example.

Alternatively, the vehicle/dealer database may comprise an inventory management system wherein the financial services company offering the automobile loan may perfect a lien on the selected vehicle electronically. For example, the automobile title transfer documents may be automatically and/or electronically completed once the electronic signature of the automobile loan is received from the customer 301. Therefore, a purchase agreement between the customer 301 and the automobile dealer at which the selected vehicle is located may be prepared and electronically communicated to the customer 301 or automobile dealer. After electronic lien perfection, funds for purchase of the automobile may be electronically deposited or transferred into an account of the customer 301 from the consumer loans origination system 315 of FIG. 3, for example.

Figure 5:
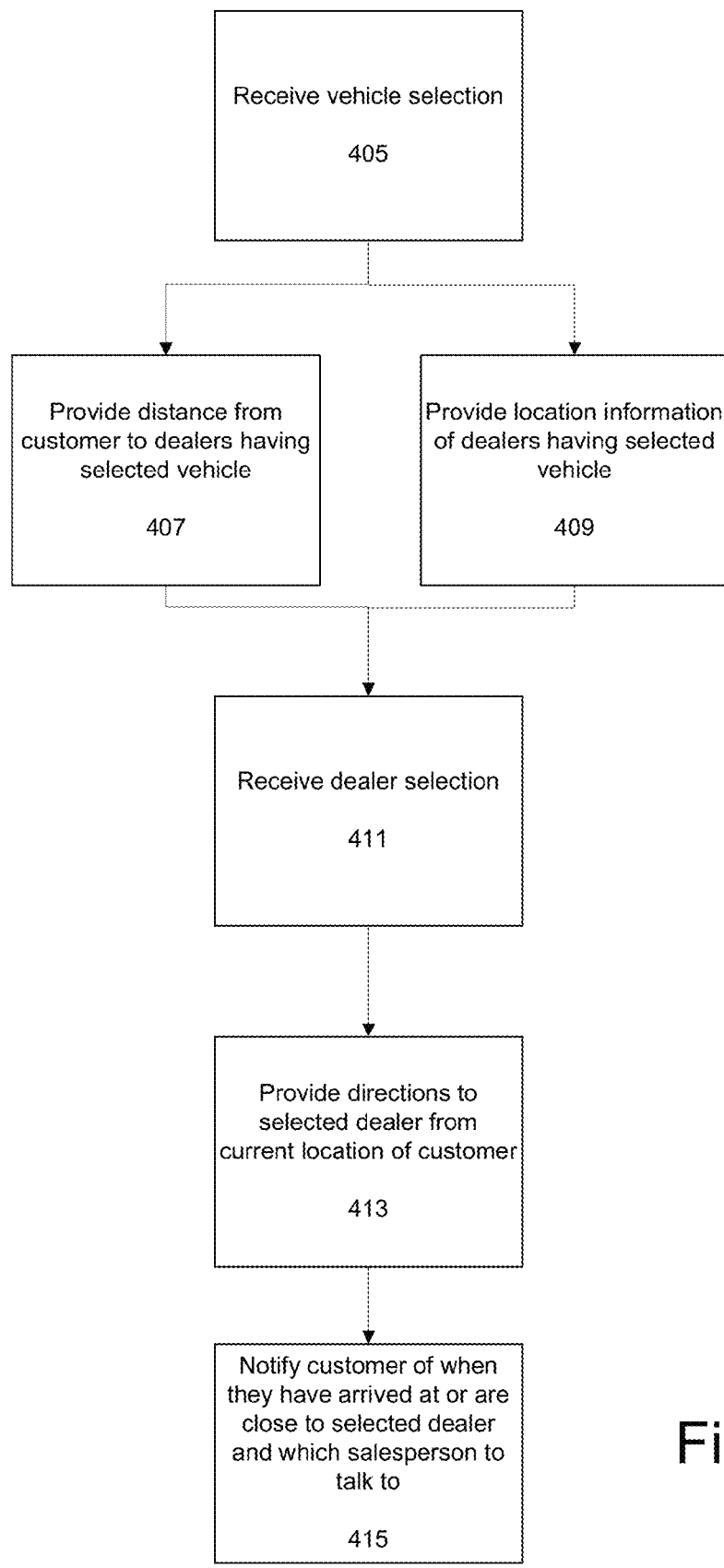
FIG. 5 is a flowchart illustrating an example process for providing automobile dealer location information in conjunction with integrated purchasing of vehicles and vehicle insurance.

Referring next to FIG. 5, shown is a flowchart illustrating an example process for providing automobile dealer location information in conjunction with integrated purchasing of vehicles and vehicle insurance. First a vehicle selection is received 405 as shown in FIG. 4, for example. Then the distance from the customer to automobile dealers having the selected vehicle may be provided 407. Also, specific location information of the dealers having the selected vehicle may be provided 409 as well. The location information regarding the automobile dealers may be retrieved from the automobile dealer network 309 and associated vehicle/dealer database of FIG. 3, for example. This information may be cross referenced with global positioning system (GPS) data or cellular triangulation data communicated from the mobile device 303 of the customer 301 to provide a distance from a current location of the customer's mobile device 303 to the various automobile dealers. Also, using the information above alerts may optionally be provided to the customer 301 on the customer's mobile device 303 when the mobile device 303 is within a certain predetermined distance of one or more dealers having the selected vehicle available.

An automobile dealer selection may then be received 411 from the customer 301 and then directions to the selected dealer from the current location of the customer 301 may be provided 413 to the customer's mobile device 303, for example. The location information of the selected dealer may be cross referenced with global positioning system (GPS) data or cellular triangulation data communicated from the mobile device 303 of the customer 301 to provide directions from a current location of the customer's mobile device 303 to the various automobile dealers. The direction information may be retrieved from a third party database or service such as Google® Maps, for example. The customer may also be updated on their status as far as current distance to the selected dealer and a notification or alert may be provided 415 to the customer when they have arrived at the selected dealer location. Information regarding the specific location of and current distance to the selected vehicle on the automobile dealer sales lot and salesperson information may also be provided on the mobile device 303 of the customer 301.

Figure 6:
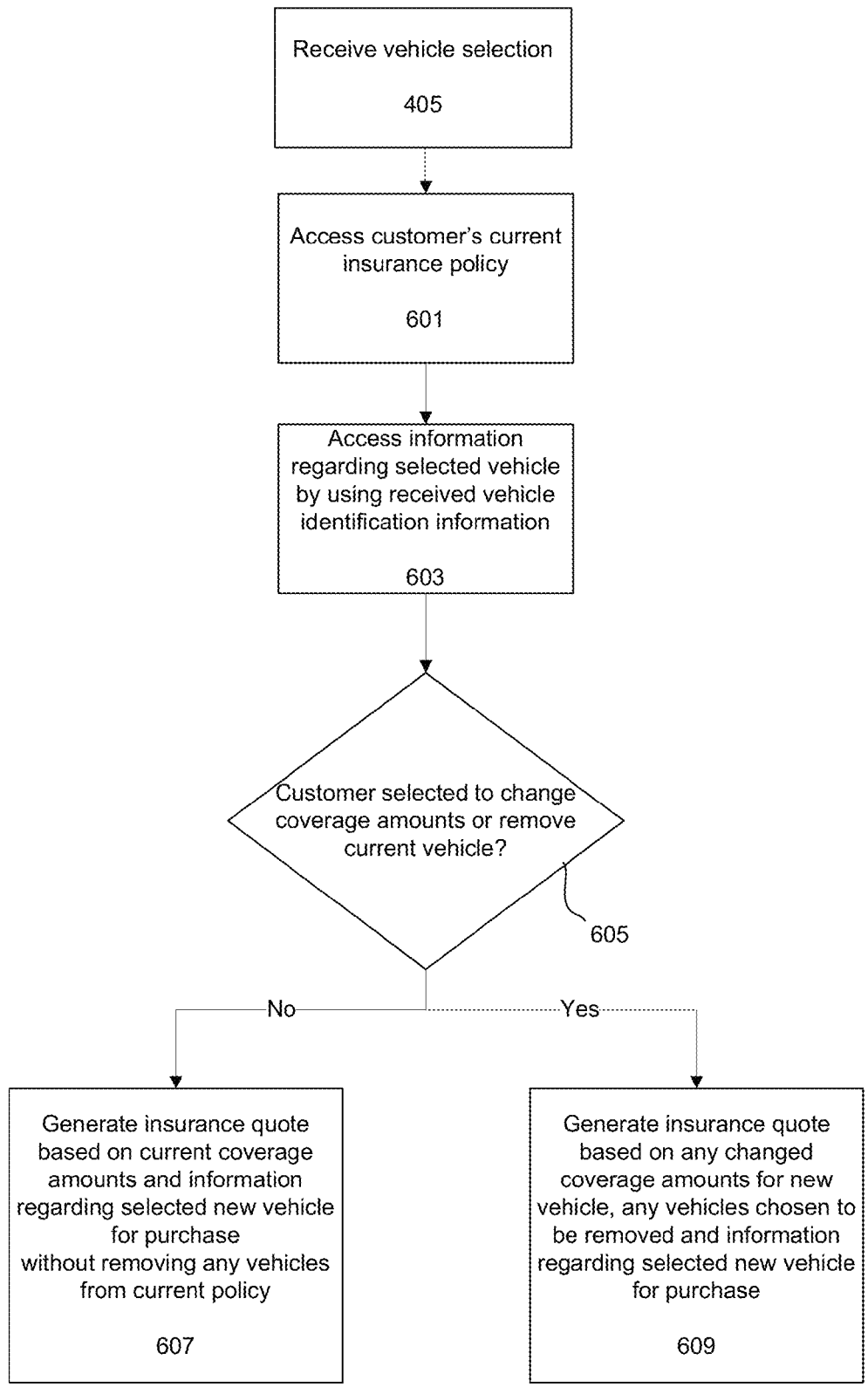
FIG. 6 is a flowchart illustrating an example process for providing an insurance quote for an automobile in conjunction with integrated purchasing of vehicles and vehicle insurance.

Referring next to FIG. 6, shown is a flowchart illustrating an example process for providing an insurance quote for an automobile in conjunction with integrated purchasing of vehicles and vehicle insurance. First a vehicle selection is received 405 as shown in FIG. 4, for example. The customer's current insurance policy may then be accessed 601. The customer's current insurance records regarding their current automobile insurance policy may be in the financial company corporate database 305 and or in the insurance systems 307 of FIG. 3, for example. Next, information is accessed 603 regarding a selected vehicle by using a received vehicle identification information, such as a VIN, for example. This information regarding the selected vehicle may be accessed in the vehicle/dealer database 311 or other vehicle databases based on the vehicle identification information. It is then determined 605 whether the customer 301 has selected to change coverage amounts or remove a current vehicle from their current insurance policy. For example, the customer 301 may wish to replace a current vehicle on their current insurance policy with the selected new vehicle. This may often be the case if the customer 301 is trading in the vehicle currently on their insurance policy at an automobile dealer for a new vehicle or for credit towards a new vehicle. The customer 301 may communicate this change, for example, via their mobile device 303.

If the customer 301 has not selected to change coverage amounts or remove a current vehicle from their current insurance policy, then an insurance quote is automatically generated 607 based on the customer's current coverage amounts and information regarding the selected new vehicle for purchase without removing any vehicles from current policy. If the customer 301 has not selected to change coverage amounts or remove a current vehicle from their current insurance policy, then an insurance quote is generated 609 based on any changed coverage amounts for the new selected vehicle, any vehicles chosen to be removed from the current insurance policy, and information regarding selected new vehicle for purchase These insurance quotes may be generated 607 609 by the insurance systems 307 of FIG. 3, for example, and then communicated to the mobile device 303 along with the automobile financing quote.

Figure 7:
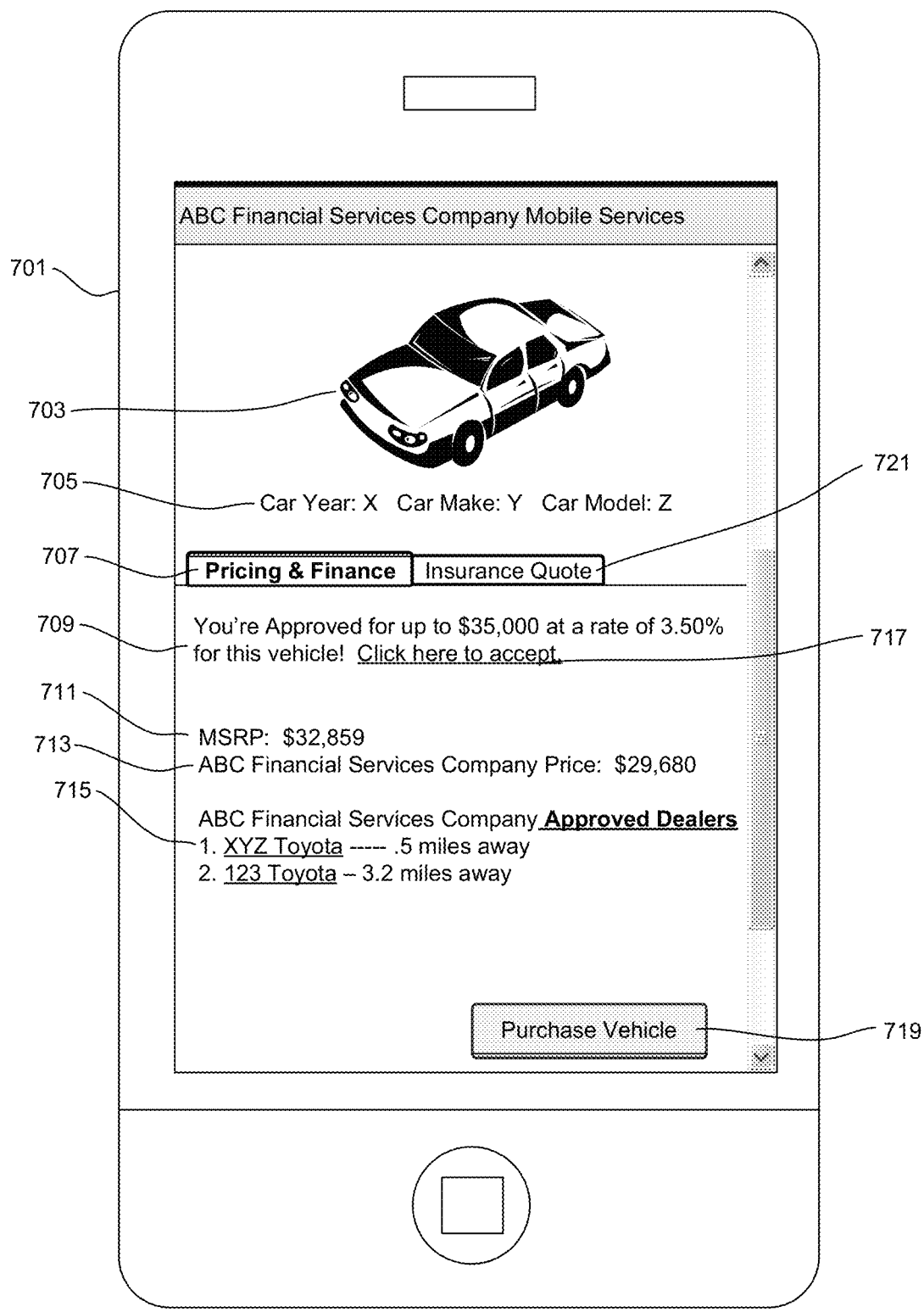
FIG. 7 is a diagram of an example mobile device displaying an example user interface having a selected vehicle's pricing and financing options according to systems and methods for integrated purchasing of vehicles and vehicle insurance.

Referring next to FIG. 7, shown is a diagram of an example mobile device displaying an example user interface having a selected vehicle's pricing and financing options according to systems and methods for integrated purchasing of vehicles and vehicle insurance. Shown is an example mobile device 701 having displayed thereon an example photo of drawing of the selected vehicle 703, vehicle information 705 such as the vehicle year, make and model, a tab 707 currently selected for displaying the selected vehicle pricing and finance information, a tab 721 not currently selected for displaying the selected vehicle insurance quote information, information regarding financing terms 709 for the selected automobile, means for acceptance 717 719 of the automobile financing terms, a manufactured suggested retail price (MSRP) 711 of the selected vehicle, a discounted price 713 offered as part of a discount program of an example financial services company providing the offered financing, and a list 715 of dealers approved to offer the discounted price along with distance to the dealers on the list from a current location of the mobile device 701. When the customer selects to accept the offered financing via the means for acceptance 717 of the automobile financing terms, the automobile loan funding instructions may be sent as described above to the dealer, or the a lien on the selected automobile may be perfected electronically as described above.

Figure 8:
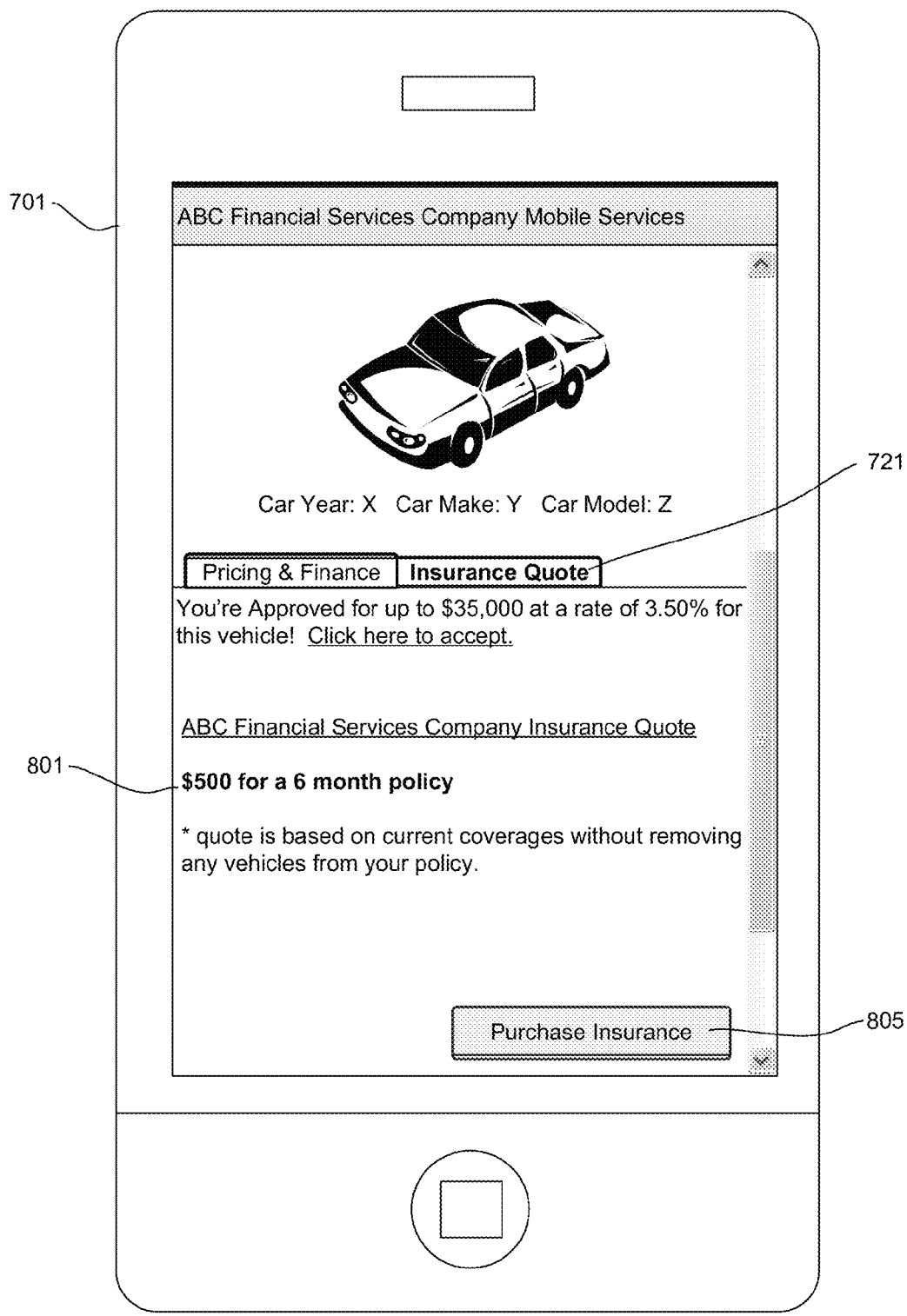
FIG. 8 is a diagram of an example mobile device displaying an example user interface having a selected vehicle's insurance coverage options according to systems and methods for integrated purchasing of vehicles and vehicle insurance.

Referring next to FIG. 8 shown is a diagram of an example mobile device displaying an example user interface having a selected vehicle's insurance coverage options according to systems and methods for integrated purchasing of vehicles and vehicle insurance. If the customer clicks on the "Insurance Quote" tab 721, then information 801 regarding an insurance quote for the selected vehicle may be offered according to the process described above with reference to FIG. 6 and displayed on the mobile device 701 as shown in FIG. 8. For example, in the example provided in FIG. 8, an insurance quote is being offered at a premium of $500 for a 6 month policy for the selected vehicle based on the current coverage amounts in a current automobile insurance policy held by the customer 301 without removal of any vehicle from the current policy. An example means for acceptance of the insurance quote is as a button 719. For example, if the customer clicks on the "Purchase Insurance" button 805 then an insurance policy covering the selected vehicle according to the terms 801 displayed is purchased and issued according to the process described above with reference to FIG. 6. The customer clicking on the "Purchase Insurance" button 805 constitutes their electronic acceptance or signature for acceptance of the insurance policy adding the selected vehicle.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A non-transitory computer readable medium for integrated purchasing of vehicles and vehicle insurance comprising computer executable instructions for:
   electronically receiving vehicle searching criteria from a potential purchaser;
   electronically providing to the potential purchaser, available vehicles based on searching criteria;
   electronically receiving a vehicle selection of the provided available vehicles from the potential purchaser;
   automatically providing to the potential purchaser, a financing quote for purchase of the vehicle selected;
   automatically providing to the potential purchaser, an insurance quote for the vehicle selected;
   receiving from the potential purchaser, an electronic signature for the financing quote for purchase of the vehicle selected;
   automatically issuing to the potential purchaser, an automobile loan for purchase of the selected vehicle based on the received electronic signature for the financing quote;
   automatically providing to the potential purchaser, a list of choices of dealer funding instructions, the instructions describing delivery methods of payment to an automobile dealer of the selected vehicle for the vehicle selected for fulfillment of the automobile loan; and
   automatically providing dealer funding instructions to the automobile dealer according to a selected delivery method for the dealer funding instructions, said selected delivery method received electronically.

2. The non-transitory computer readable medium of claim 1, further comprising computer executable instructions for:
   receiving an electronic signature for the issuance of an automobile insurance policy covering the vehicle selected; and
   automatically issuing the insurance policy covering the vehicle selected based on the received electronic signature for the issuance of the insurance policy.

3. The non-transitory computer readable medium of claim 2, wherein the insurance policy issued is an update to a current existing automobile insurance policy with the selected vehicle added to the existing automobile insurance policy.

4. The non-transitory computer readable medium of claim 2, further comprising computer executable instructions for:
   receiving an electronic signature for the financing quote for purchase of the vehicle selected; and
   automatically issuing an automobile loan for purchase of the selected vehicle based on the received electronic signature for the financing quote.

5. The non-transitory computer readable medium of claim 1, wherein the computer executable instructions for providing the financing quote for purchase of the vehicle selected and providing the insurance quote for the vehicle selected comprise computer executable instructions for providing the financing quote and insurance quote simultaneously.

6. A system implemented on one or more computer processors for locating automobile dealers for potential purchase of an automobile comprising:
   at least one subsystem coupled to the system and configured for electronically receiving a vehicle selection;
   at least one subsystem coupled to the system and configured for automatically providing a list of one or more automobile dealers that have the selected vehicle available for purchase and location information regarding the one or more automobile dealers;
   at least one subsystem coupled to the system and configured for electronically receiving a dealer selection from the list of automobile dealers; and
   at least one subsystem coupled to the system and configured for automatically providing directions to the selected automobile dealer from a current location of a mobile device.

7. The system of claim 6, wherein the location information comprises one or more distances from a current location of the mobile device to the one or more automobile dealers.

8. The system of claim 6, further comprising at least one subsystem configured for automatically notifying a customer of when the customer has arrived at the selected dealer.

9. The system of claim 8, wherein the at least one subsystem configured for automatically notifying comprises at least one subsystem configured for automatically sending a notification to the mobile device when the mobile device has arrived at the selected dealer.

10. The system of claim 6, further comprising:
    at least one subsystem configured for automatically providing a financing quote for purchase of the vehicle selected; and
    at least one subsystem configured for automatically providing an insurance quote for the vehicle selected.

11. The system of claim 10, further comprising:
    at least one subsystem configured for receiving an electronic signature for the financing quote for purchase of the vehicle selected; and
    at least one subsystem configured for automatically issuing an automobile loan for purchase of the selected vehicle based on the received electronic signature for the financing quote.

12. The system of claim 11, further comprising:
    at least one subsystem configured for automatically providing a list of choices of dealer funding instruction delivery methods; and at least one subsystem configured for automatically providing dealer funding instructions to an automobile dealer of the selected vehicle for fulfillment of the automobile loan according to a selected delivery method for the dealer funding instructions, said selected delivery method received electronically.

13. A system implemented on one or more computer processors for integrated purchasing of vehicles and vehicle insurance comprising:
- at least one subsystem coupled to the system and configured for electronically receiving a vehicle selection for potential purchase;
- at least one subsystem coupled to the system and configured for automatically accessing a current automobile insurance policy of a customer;
- at least one subsystem coupled to the system and configured for automatically accessing information regarding the selected vehicle by using received vehicle identification information based on the vehicle selection;
- at least one subsystem coupled to the system and configured for automatically generating an insurance quote based on current coverage amounts indicated in the accessed insurance policy and information regarding the selected purchase without removing any vehicles from current policy if the customer previously selected not to change coverage amounts or remove a current vehicle from the insurance policy for generating the insurance quote;
- at least one subsystem coupled to the system and configured for automatically generating an insurance quote based on any changed coverage amounts for the selected vehicle for potential purchase, any vehicles chosen to be removed from the insurance policy, and information regarding the selected vehicle for potential purchase generating the insurance quote;
- at least one subsystem coupled to the system and configured for automatically providing a list of one or more automobile dealers that have the selected vehicle available for purchase and location information regarding the one or more automobile dealers;
- at least one subsystem coupled to the system and configured for electronically receiving a dealer selection from the list of automobile dealers; and
- at least one subsystem coupled to the system and configured for automatically providing directions to the selected automobile dealer from a current location of a mobile device.

14. The system of claim 13, further comprising:
- at least one subsystem configured for receiving an electronic signature in response to the automatically generated insurance quote for issuance of an automobile insurance policy covering the selected vehicle; and
- at least one subsystem configured for automatically issuing the insurance policy covering the selected vehicle based on the received electronic signature for the issuance of the insurance policy.

15. The system of claim 13, further comprising at least one subsystem configured for sending an alert to a mobile device when the mobile device is within a predetermined distance from an automobile dealer having the selected vehicle available.

16. The system of claim 13, further comprising at least one subsystem configured for automatically providing a financing quote for purchase of the selected vehicle.

17. The system of claim 16, further comprising:
- at least one subsystem configured for receiving an electronic signature for the financing quote for purchase of the selected vehicle; and
- at least one subsystem configured for automatically issuing an automobile loan for purchase of the selected vehicle based on the received electronic signature for the financing quote.

18. The system of claim 13, wherein the at least one subsystem configured for automatically providing the list of one or more automobile dealers comprises at least one subsystem configured for automatically providing the list for display on the mobile device.

* * * * *